United States Patent
Iio (10) Patent No.: US 7,862,937 B2
(45) Date of Patent: Jan. 4, 2011

(54) ANODE EFFLUENT CONTROL IN FUEL CELL POWER PLANT

(75) Inventor: Masatoshi Iio, Yokosuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 1413 days.

(21) Appl. No.: 10/554,317

(22) PCT Filed: Apr. 9, 2004

(86) PCT No.: PCT/JP2004/005103

§ 371 (c)(1),
(2), (4) Date: Oct. 24, 2005

(87) PCT Pub. No.: WO2004/105169

PCT Pub. Date: Dec. 2, 2004

(65) Prior Publication Data

US 2007/0009772 A1    Jan. 11, 2007

(30) Foreign Application Priority Data

May 26, 2003    (JP)    ............................. 2003-147996

(51) Int. Cl.
*H01M 8/04*    (2006.01)
(52) U.S. Cl. ........................ 429/415; 429/408; 429/428; 429/443; 429/444
(58) Field of Classification Search ........................ None
See application file for complete search history.

(56) References Cited

U.S. PATENT DOCUMENTS 6,242,120 B1    6/2001    Herron

2002/0022167 A1    2/2002    Herron

FOREIGN PATENT DOCUMENTS

| FR | 2 831 994 A1 | 5/2003 |
|----|------|-------|
| JP | 2000-058092 | 2/2000 |
| JP | 2000-243417 A | 9/2000 |
| JP | 2001-006709 A | 1/2001 |
| JP | 2003-317752 | 11/2003 |

OTHER PUBLICATIONS

Office Action mailed Feb. 2, 2010 in Japanese Application No. 2003-147996.

*Primary Examiner*—Jennifer K Michener
*Assistant Examiner*—Tony Chuo
(74) *Attorney, Agent, or Firm*—Foley & Lardner LLP (57) ABSTRACT

A fuel cell stack (1) performs power generation using an anode gas having hydrogen as its main component, and after a power generation reaction, the anode gas is discharged as anode effluent. The anode effluent is re-circulated into the anode gas through a return passage (5). The return passage (5) comprises a purge valve (8) which discharges the anode effluent to the outside of the passage. In this invention, calculation of a first energy loss caused by an increase in non-hydrogen components in the anode gas while the purge valve (8) is closed (S7, S28), and calculation of a second energy loss which corresponds to the amount of hydrogen lost from the anode gas by opening the purge valve (8) (S8, S29) are performed. By opening the purge valve (8) when the second energy loss equals or falls below the first energy loss, the start timing of purging is optimized.

25 Claims, 11 Drawing Sheets

ANODE EFFLUENT CONTROL IN FUEL CELL POWER PLANT

FIELD OF THE INVENTION

This invention relates to the removal of impurity gases within anode gas that is supplied to a fuel cell stack.

BACKGROUND OF THE INVENTION

In a fuel cell power plant comprising a re-circulation passage which re-circulates anode effluent discharged from an anode into the hydrogen that is supplied to the anode, impurity gases such as nitrogen become mixed into the anode gas as an operation of the fuel cell power plant progresses. Such impurity gases cause a reduction in the hydrogen partial pressure within the anode gas, thus leading to deterioration in the output performance of the fuel cell stack.

JP2000-243417A, published by the Japan Patent Office in 2000, discloses a method of removing impurity gases by purging the gas in the re-circulation passage in accordance with a decrease in the hydrogen concentration of the anode gas or a decrease in the output of the power plant.

JP2001-006709A, published by the Japan Patent Office in 2001, discloses a method of preventing poisoning of the anode caused by carbon monoxide (CO) contained in the anode gas by mixing a small amount of oxygen into the anode gas.

SUMMARY OF THE INVENTION

By purging the gas in the re-circulation passage, however, the original hydrogen that is required for power generation is purged together with the impurity gases.

By mixing a small amount of oxygen into the anode gas, not only is carbon monoxide (CO) removed, but a part of the hydrogen reacts with the oxygen to form water ($H_2O$), and hence a part of the hydrogen gas to be used in the power generation reaction is lost.

For such reasons, measures taken in any of the prior art to remove impurity gases may instead lead to a reduction in the power generation efficiency of the fuel cell. In other words, if the purging timing and oxygen mixing timing in the prior art are not set appropriately, the expected improvement in power generation efficiency cannot be realized.

It is therefore an object of this invention to enable an improvement in the power generation efficiency of a fuel cell power plant by setting the timing of such an impurity gas removal operation appropriately.

In order to achieve the above object, this invention provides an anode effluent control method for a such a fuel cell power plant that comprises a fuel cell stack which performs power generation using anode gas having hydrogen as a main component. In the power plant, the anode gas is discharged from the fuel cell stack as anode effluent following a power generation reaction. The power plant further comprises a return passage which re-circulates the anode effluent into the anode gas, and a purge valve which discharges the anode effluent in the return passage to the outside of the passage.

The control method comprises calculating a first energy loss caused by an increase in a non-hydrogen component in the anode gas while the purge valve is closed, calculating a second energy loss which corresponds to an amount of hydrogen lost when the anode gas when the purge valve is opened, maintaining the purge valve in a closed state when the second energy loss is larger than the first energy loss, and opening the purge valve when the second energy loss equals or falls below the first energy loss.

This invention also provides an anode effluent control device for the fuel cell stack as described above. The device comprises a return passage which re-circulates the anode effluent into the anode gas, a purge valve which discharges the anode effluent in the return passage to the outside of the passage, and a programmable controller to control opening and closing of the purge valve. The controller is programmed to calculate a first energy loss caused by an increase in a non-hydrogen component in the anode gas while the purge valve is closed, calculate a second energy loss which corresponds to an amount of hydrogen lost from the anode gas when the purge valve is opened, maintain the purge valve in a closed state when the second energy loss is larger than the first energy loss, and open the purge valve when the second energy loss equals or falls below the first energy loss.

The details as well as other features and advantages of this invention are set forth in the remainder of the specification and are shown in the accompanying drawings.

DESCRIPTION OF THE PREFERRED EMBODIMENTS

Figure 1:
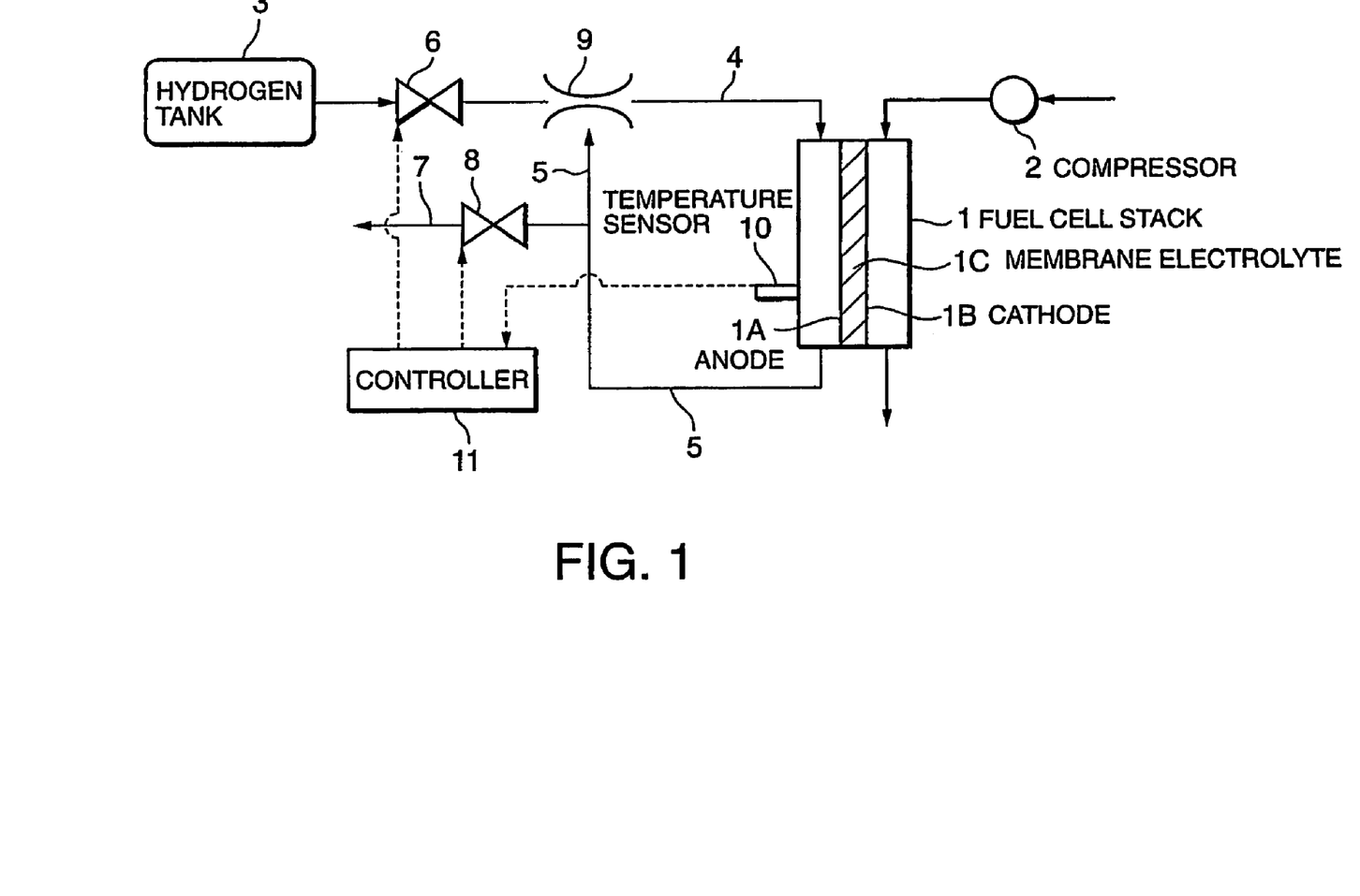
FIG. 1 is a schematic diagram of a fuel cell power plant according to this invention.

Referring to FIG. 1 of the drawings, a fuel cell stack 1 is constituted by a stacked body of fuel cells which perform power generation by means of an electrochemical reaction between hydrogen that is supplied to an anode 1A as anode gas and oxygen in the air that is supplied to a cathode 1B as cathode gas through a electrolyte membrane 1C.

Hydrogen is supplied to the anode 1A through a hydrogen supply passage 4 from a high-pressure hydrogen tank 3. A control valve 6 is provided on the hydrogen supply passage 4 to control the flow rate of hydrogen supplied to the hydrogen supply passage 4 from the hydrogen tank 3.

Anode effluent that is discharged from the anode 1A after the reaction is re-supplied to the hydrogen supply passage 4 through an ejector 9 from a return passage 5.

Air is supplied to the cathode 1B by a compressor 2.

A purge passage 7 for purging the anode effluent outside is connected to the return passage 5 via a purge valve 8.

As anode effluent continues to be re-circulated into the hydrogen supply passage 4 from the return passage 5 during an operation of the fuel cell power plant, impurities in the anode gas that is supplied to the anode 1A increase, causing a reduction in the hydrogen partial pressure PH2n, which leads to a reduction in the output of the fuel cell stack 1.

A controller 11 removes the impurities in the anode gas that is supplied to the anode 1A by controlling the opening of the control valve 6 and purge valve 8.

The controller 11 is constituted by a microcomputer comprising a central processing unit (CPU), read-only memory (ROM), random access memory (RAM), and an input/output interface (I/O interface). The controller maybe constituted by a plurality of microcomputers.

A temperature signal from a temperature sensor 10 which detects the temperature of the fuel cell stack 1 is input into the controller 11 as a parameter for this control.

In addition to hydrogen, the following impurity gases or gas components are contained in the anode effluent that is discharged to the return passage 5 from the fuel cell stack 1:

(1) gas having as its main component nitrogen that flows into the anode 1A from the cathode 1B through the electrolyte membrane 1C, and (2) gas components such as carbon monoxide (CO) contained in the hydrogen that is supplied from the hydrogen tank 3.

Figure 2:
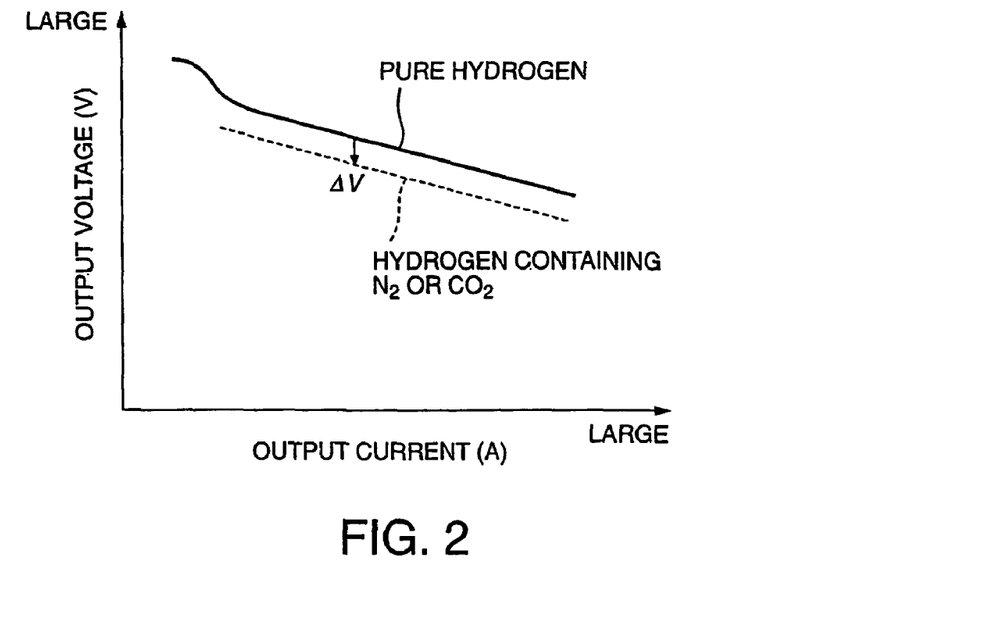
FIG. 2 is a diagram illustrating the relationship between impurities and reductions in the output of a fuel cell stack.

Re-circulation of the anode effluent causes these impurity gases and gas components to mix with the hydrogen in the hydrogen supply passage 4, leading to a reduction in the hydrogen partial pressure PH2n of the anode gas. As a result, as shown in FIG. 2, the output voltage of the fuel cell 1 decreases as specified by ΔV in the figure, and thus the power generation efficiency of the fuel cell 1 deteriorates.

The amount of impurity gases increases as the fuel cell 1 continues to operate while re-circulating anode effluent, and the hydrogen partial pressure PH2n gradually decreases accordingly.

Figure 3:
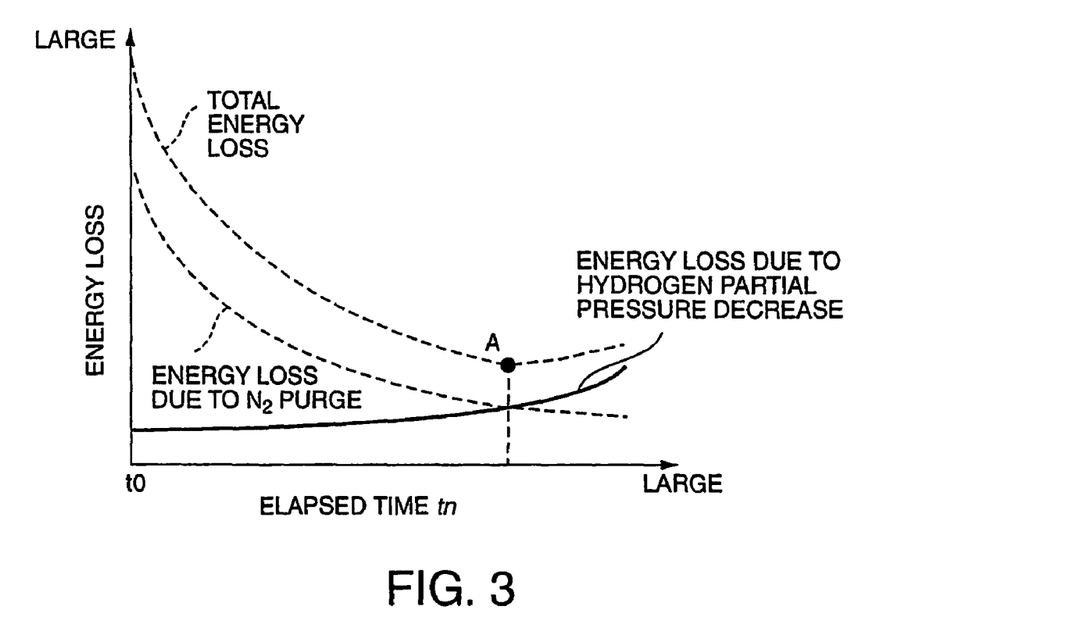
FIG. 3 is a diagram illustrating the relationship between the duration of an operation of the fuel cell stack and the energy balance.

Referring to FIG. 3, energy loss caused by a reduction in the hydrogen partial pressure PH2n increases in relation to the duration of an operation of the fuel cell 1 in which anode effluent is re-circulated, as shown by the solid line in the diagram. The rate of increase also increases as the duration of the operation increases. The abscissa of the diagram indicates the elapsed time tn from the end of purging.

Conversely, when the purge valve 8 is opened to purge the anode effluent in the return passage 5, the impurities in the anode gas that is supplied to the anode 1A decrease, but at the same time, the hydrogen contained in the anode effluent is also purged. If purging is begun when the hydrogen concentration in the anode gas reaches a predetermined concentration, and purging is halted when another predetermined concentration is reached, the hydrogen energy lost by purging is constant, regardless of the purging duration. The hydrogen energy that is discharged by purging becomes gradually smaller as the purging duration shortens.

On the other hand, since the abscissa of FIG. 3 indicates the elapsed time from the end of purging, if purging is resumed at a timing corresponding to the elapsed time of tn, then the elapsed time tn corresponds to the purging interval. As shown by the broken line in FIG. 3, the hydrogen energy that is lost when purging is not performed becomes smaller as the purging interval becomes longer. The sum of the energy loss due not to perform purging and the energy loss due to purging takes a minimum value at a point A, as shown by the dotted line in the diagram. In other words, in the section between the end of purging and point A, or in the time period from t0 (=0) to tn, energy loss is smaller when purging is not performed, but when the elapsed time passes the point A, or after the time tn, energy loss is larger when purging is not performed. Hence in terms of energy balance, purging is preferably performed at the point A.

Next, referring to FIG. 4, a purging start determination routine executed by the controller 11 to determine the start of purging will be described. This routine is implemented repeatedly by the controller 11 at a fixed interval Δt while the fuel cell power plant is operative. The fixed interval Δt is set at 100 milliseconds.

First, in a step S1, the controller 11 checks a purge flag fp. The purge flag fp indicates whether or not anode effluent purging is being performed through the purge valve 8. The purge flag fp has a value of either unity or zero. The initial value of the purge instruction flag fp is zero.

When the purge flag fp is at unity, this indicates that purging is underway. In this case, the controller 11 performs the processing in a step S12 to be described below.

When the purge flag fp is at zero, the controller 11 calculates the operating duration tn from the end of the previous purging operation in a step S2. This calculation is performed by adding the routine execution interval Δt to a previous routine start time $tn_{-1}$.

Next, the nitrogen partial pressure PNn of the anode gas is calculated in a step S3.

The controller 11 performs this calculation using the following equations (1) and (2).

First, the amount of nitrogen gas permeating the electrolyte membrane 1C from the cathode 1B to the anode 1A of the fuel cell stack 1 from the time $tn_{-1}$ to the time tn is calculated according to the following equation (1).

$$\text{Amount of permeated nitrogen gas} = \quad (1)$$
$$K \cdot \frac{\text{membrane area}}{\text{membrane thickness}} \cdot$$
$$\text{(nitrogen partial pressure difference between}$$
$$\text{anode gas and cathode gas)} \cdot \Delta t \text{ where,}$$
$$K = \text{gas permeation coefficient of the electrolyte}$$
$$\text{membrane } 1C \text{ during an operation.}$$

When the fuel cell stack 1 is operated in a steady state, the nitrogen partial pressure of the cathode gas is substantially constant. Conversely, the nitrogen partial pressure PNn of the anode gas gradually increases over time due to the nitrogen gas which permeates the electrolyte membrane 1C. This relationship can be determined by experiment, simulation, or calculation on the basis of the characteristic of the electrolyte membrane 1C.

A map of the nitrogen gas partial pressure difference between the anode and cathode in accordance with the operating duration tn is stored in advance in the internal memory (ROM) of the controller 11, and the nitrogen partial pressure difference between the anode gas and cathode gas is determined upon calculation of the equation (1) by referring to this map on the basis of the operating duration tn. The membrane area and membrane thickness of the electrolyte membrane 1C are known fixed values.

The value of the permeated nitrogen gas amount of the equation (1), having been time-integrated according to the equation (2), is the overall permeated nitrogen gas amount from an operating duration of zero to tn.

$$\text{overall permeated nitrogen gas amount} = f(\text{permeated nitrogen gas amount}) \propto f(\text{nitrogen gas partial pressure difference between anode and cathode}) \cdot \Delta t \quad (2)$$

Accordingly, the nitrogen partial pressure PNn of the anode gas is expressed by the following equation (3).

$$PNn = (\text{anode gas pressure}) \cdot \frac{\dfrac{\text{normal-pressure volume of nitrogen in passage}}{(\text{passage volume}) \cdot (\text{anode gas pressure})}}{\text{normal pressure}} \quad (3)$$

The normal-pressure volume of the nitrogen in the passage is calculated from the overall permeated nitrogen gas amount obtained in the equation (2). The passage volume is the volume of the re-circulation passage from the anode 1A through the return passage 5 and a part of the hydrogen supply passage 4 and back to the anode 1A. The normal pressure and volume of the passage are known values. The anode gas pressure is present in both the denominator and the numerator of the equation (3), and is therefore cancelled. Hence the nitrogen partial pressure PNn of the anode gas can be calculated from the calculation result of the equation (2).

Having calculated the nitrogen partial pressure PNn of the anode gas in this manner, the controller 11 reads a temperature TCSAn of the fuel cell stack 1 detected by the temperature sensor 10 in a step S4.

Figure 5:
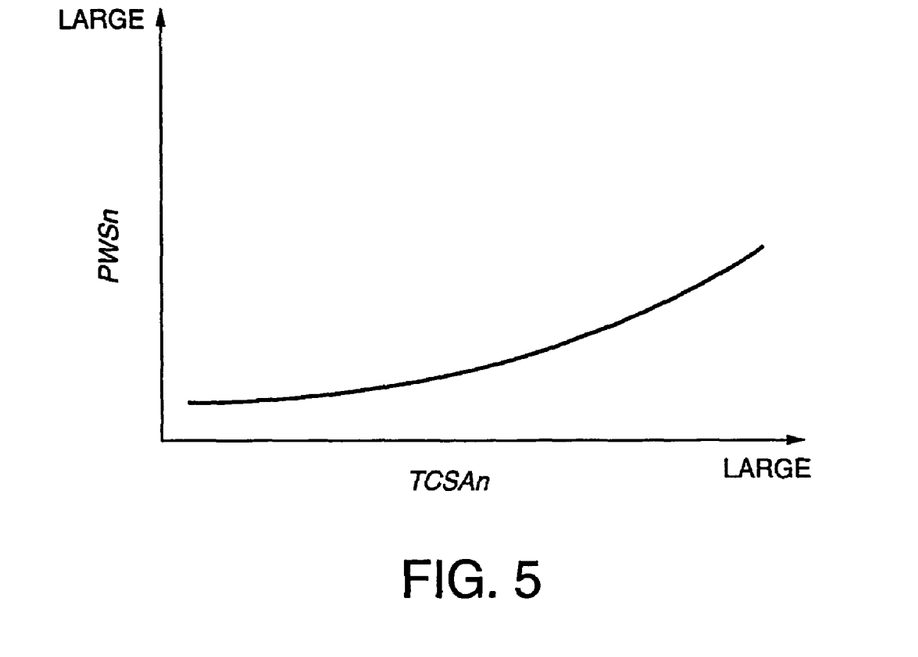
FIG. 5 is a diagram illustrating the characteristic of a map, which is stored in the controller, of a water vapor partial pressure PWSn in the anode gas.

Next, in a step S5, the controller 11 refers to a map having the characteristic shown in FIG. 5, which is stored in the internal memory (ROM) in advance, to determine a water vapor partial pressure PWSn of the anode gas from the temperature TCSAn of the fuel cell stack 1.

Next, in a step S6, the controller 11 calculates the hydrogen partial pressure PH2n of the anode gas from the nitrogen partial pressure PNn determined in the step S3 and the water vapor partial pressure PWSn determined in the step S5 according to the following equation (4).

$$PH2n = \text{anode gas pressure} - (PNn + PWSn) \quad (4)$$

When the fuel cell stack 1 is operated in a steady state, the anode gas pressure is a constant, known value.

Figure 6:
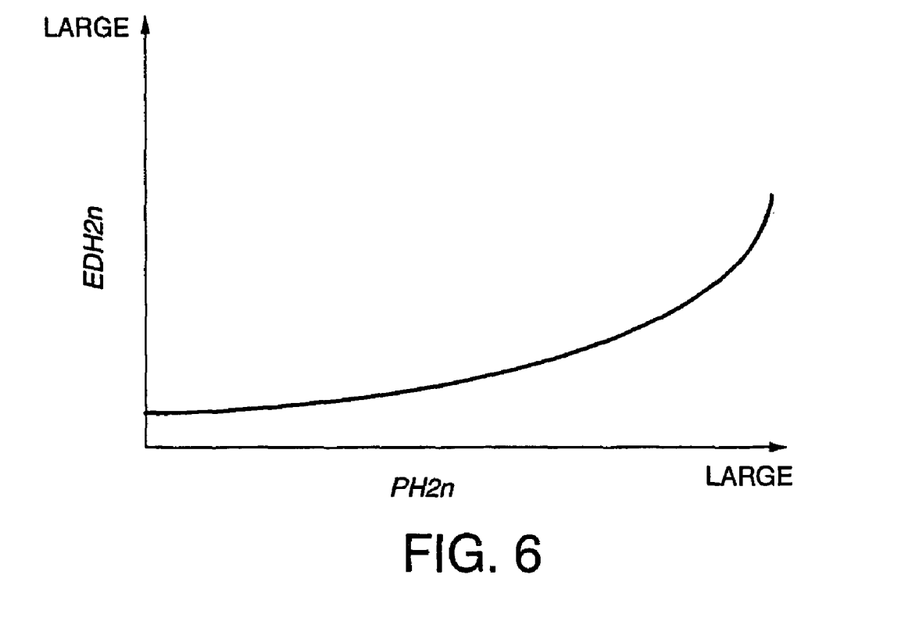
FIG. 6 is a diagram illustrating the characteristic of a map, which is stored in the controller, defining the relationship between hydrogen partial pressure PH2n in the anode gas and the generated energy EDH2n of the fuel cell stack.

Next, in a step S7, the controller 11 determines variation $\Delta EDH2n$ in the generated energy EDH2n of the fuel cell stack 1 caused by a reduction in the hydrogen partial pressure PH2n. For this purpose, a map having the characteristic shown in FIG. 6, which defines the relationship between the hydrogen partial pressure PH2n and the generated energy EDH2n, is stored in the internal memory (ROM) of the controller 11 in advance. The controller 11 refers to the map to determine $\Delta EDH2n$ from the hydrogen partial pressure PH2n calculated during execution of the current routine and a hydrogen partial pressure $PH2n_{-1}$ calculated during execution of the previous routine. If the hydrogen partial pressure PH2n has decreased, the value of the variation $\Delta EDH2n$ in the generated energy EDH2n obtained from the map becomes negative. The variation $\Delta EDH2n$ corresponds to the claimed first energy loss.

Figure 7:
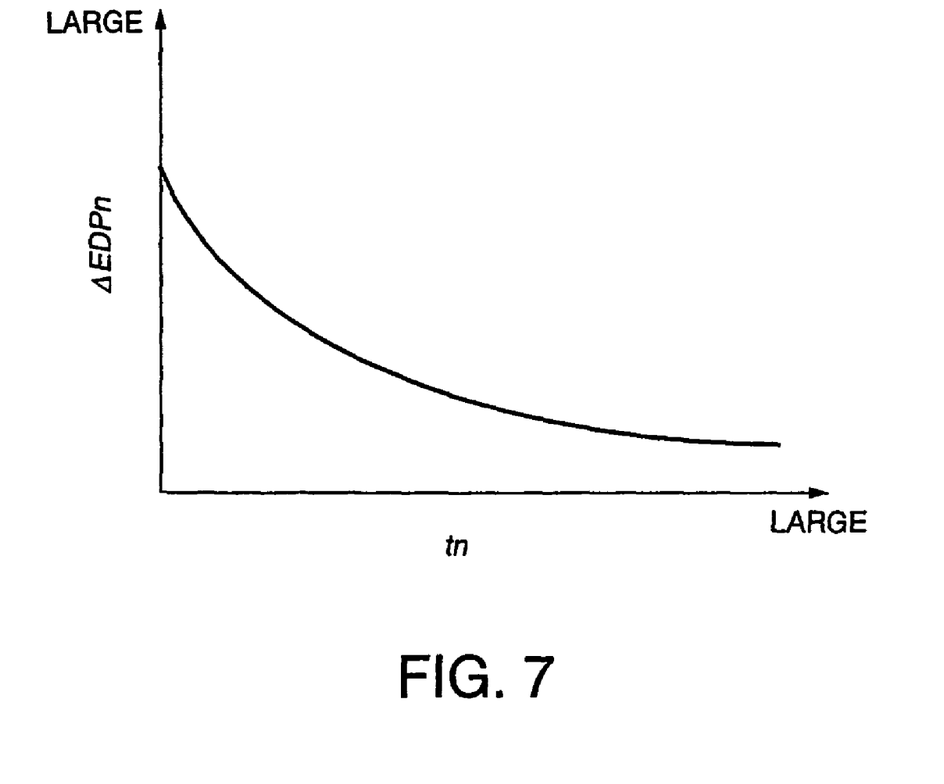
FIG. 7 is a diagram illustrating the characteristic of a map, which is stored in the controller, of variation ΔEDPn in the hydrogen energy which accumulates in the anode gas in relation to purging not being performed.

Next, in a step S8, the controller 11 calculates variation $\Delta EDPn$ in the hydrogen energy EDPn that is lost through purging. To perform this calculation, a map having the characteristic shown in FIG. 7 is stored in the internal memory (ROM) of the controller 11 in advance. FIG. 7 corresponds to the broken line in FIG. 5. $\Delta EDPn$ corresponds to the claimed second energy loss.

Next, in a step S9, the controller 11 calculates variation $\Delta EDn$ in the overall energy EDn as the sum of the variation $\Delta EDH2n$ and the variation $\Delta EDPn$.

Next, in a step S10, the controller 11 determines whether or not the variation $\Delta EDn$ in the overall energy EDn is equal to or greater than the variation $\Delta EDn-1$ that was calculated during execution of the previous routine.

If the variation $\Delta EDn$ is less than $\Delta EDn-1$, this indicates that the operating condition of the fuel cell stack 1 has not yet reached the point A in FIG. 5. If the variation $\Delta EDn$ is less than $\Delta EDn-1$, the controller 11 ends the routine without rewriting the purge flag fp.

On the other hand, if the variation $\Delta EDn$ is equal to or greater than $\Delta EDn-1$, the controller 11 sets the purge flag fp to unity in a step S11, and then ends the routine. By setting the purge flag fp to unity, the controller 11 opens the purge valve 8.

If the controller 11 determines that the purge flag fp is at unity in the aforementioned step S1, or in other words if it is determined that purging is underway, the processing of a step S12 is performed.

In the step S12, the controller 11 resets the nitrogen partial pressure PNn of the anode gas to its initial value #PN, and resets the operating duration tn to zero. The initial value #PN of the nitrogen partial pressure PNn is set at zero or a value approaching zero. These values are initialized in order to resume calculation of the energy balance following the end of purging. Following the processing of the step S12, the controller 11 ends the routine.

When the purge valve 8 is opened as a result of the processing of the step S11, the anode effluent in the return passage 5, which contains large amounts of impurities such as nitrogen, is purged, and hence the nitrogen content of the anode gas that is supplied to the anode 1A decreases. When the nitrogen partial pressure of the anode gas has decreased sufficiently, the purge valve 8 is closed again.

Various closing conditions may be set as the condition for closing the purge valve 8, for example closing after remaining open for a fixed time period, closing on the basis of the power generation output of the fuel cell stack 1, and so on. When the purge valve 8 is closed, the purge valve fp is reset to zero, and the processing of the steps S1-S11 in the routine in FIG. 4 is resumed from the beginning.

Referring to FIG. 3, by executing the routine described above, the condition of point A at which the energy balance reaches a minimum can be detected accurately, and hence the start timing of purging can be optimized, and energy loss due to purging can be minimized. Moreover, no sensors other than the temperature sensor 11 are required to execute the routine, and hence control costs can be suppressed.

Next, a second embodiment of this invention will be described with reference to FIGS. 8-13.

Figure 8:
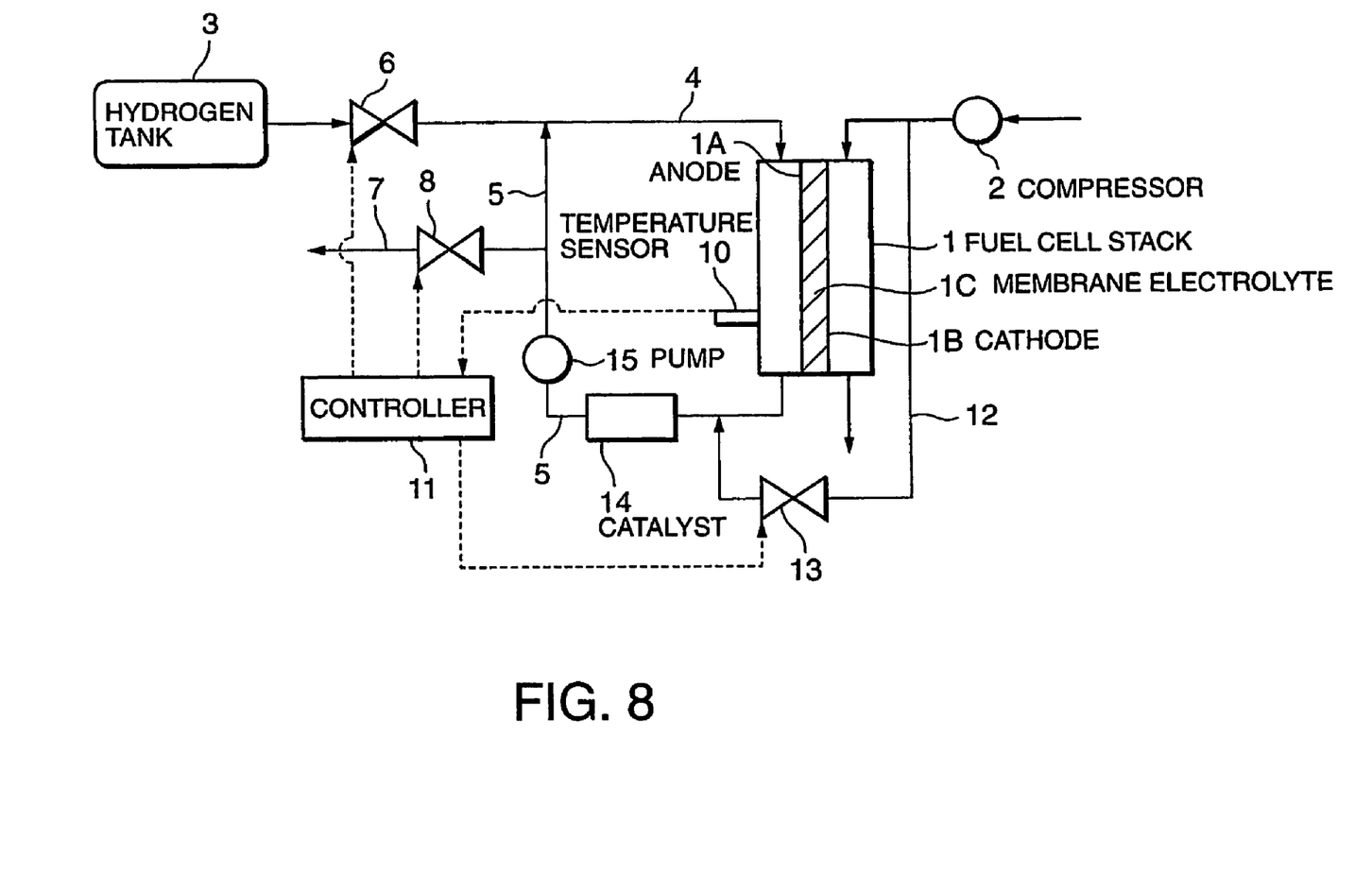
FIG. 8 is a schematic diagram of a fuel cell power plant according to a second embodiment of this invention.

Referring to FIG. 8, in addition to the constitution of the first embodiment, this embodiment comprises an air supply passage 12, an air supply valve 13, a catalyst 14, and a pump 15. However, the ejector 9 has been omitted from this embodiment.

The catalyst 14 is provided at a point on the return passage 5. The catalyst 14 functions to remove carbon monoxide (CO) from the anode effluent by means of selective oxidation of the carbon monoxide contained in the anode effluent. The oxidized carbon monoxide thus turns into carbon dioxide ($CO_2$).

The air supply passage 12 is provided to supply air, which serves as the oxidizing agent used by the catalyst 14, from the compressor 2. The air supply passage 12 is connected to the return passage 5 upstream of the catalyst 14. The air supply valve 13 serves to adjust the air supply flow through the air supply passage 12.

The pump 15 is provided on the return passage 5 downstream of the catalyst 14, and serves in place of the ejector 9 of the first embodiment to forcibly re-circulate the anode effluent in the return passage 5 to the hydrogen supply passage 4.

The opening and closing of the air supply valve 13 and operation of the pump 15 are each controlled by signals from the controller 11.

Carbon monoxide (CO) poisons the catalyst used in the anode 1A, and thus causes a reduction in the power generation efficiency of the fuel cell stack 1. It is therefore desirable to suppress the carbon monoxide contained in the anode gas to or below an allowable concentration in order to maintain the power generation performance of the fuel cell stack 1. For this purpose, the fuel cell power plant according to this embodiment supplies air to the catalyst 14 from the compressor 2 when the carbon monoxide contained in the anode gas reaches or exceeds a fixed level, thereby promoting selective oxidation of the carbon monoxide by the catalyst 14.

The anode effluent that is re-supplied to the anode 1A through the return passage 5 contains the following components:

(1) nitrogen from the cathode 1B which permeates the electrolyte membrane 1C to reach the anode 1A, (2) gas components containing CO other than the hydrogen contained in the anode gas, and (3) the air that is supplied to the catalyst 14 in order to remove the CO, and the carbon dioxide ($CO_2$) that is produced as a result of the selective oxidation reaction of the catalyst 14.

In this embodiment, the amount of nitrogen in the air supplied to the catalyst 14 and the amount of carbon dioxide produced in the catalyst 14 are taken into consideration when calculating the hydrogen partial pressure $PH2n$ of the anode gas.

Next, referring to the flowcharts in FIGS. 9-11, various routines executed by the controller 11 to perform the above control will be described.

Figure 4:
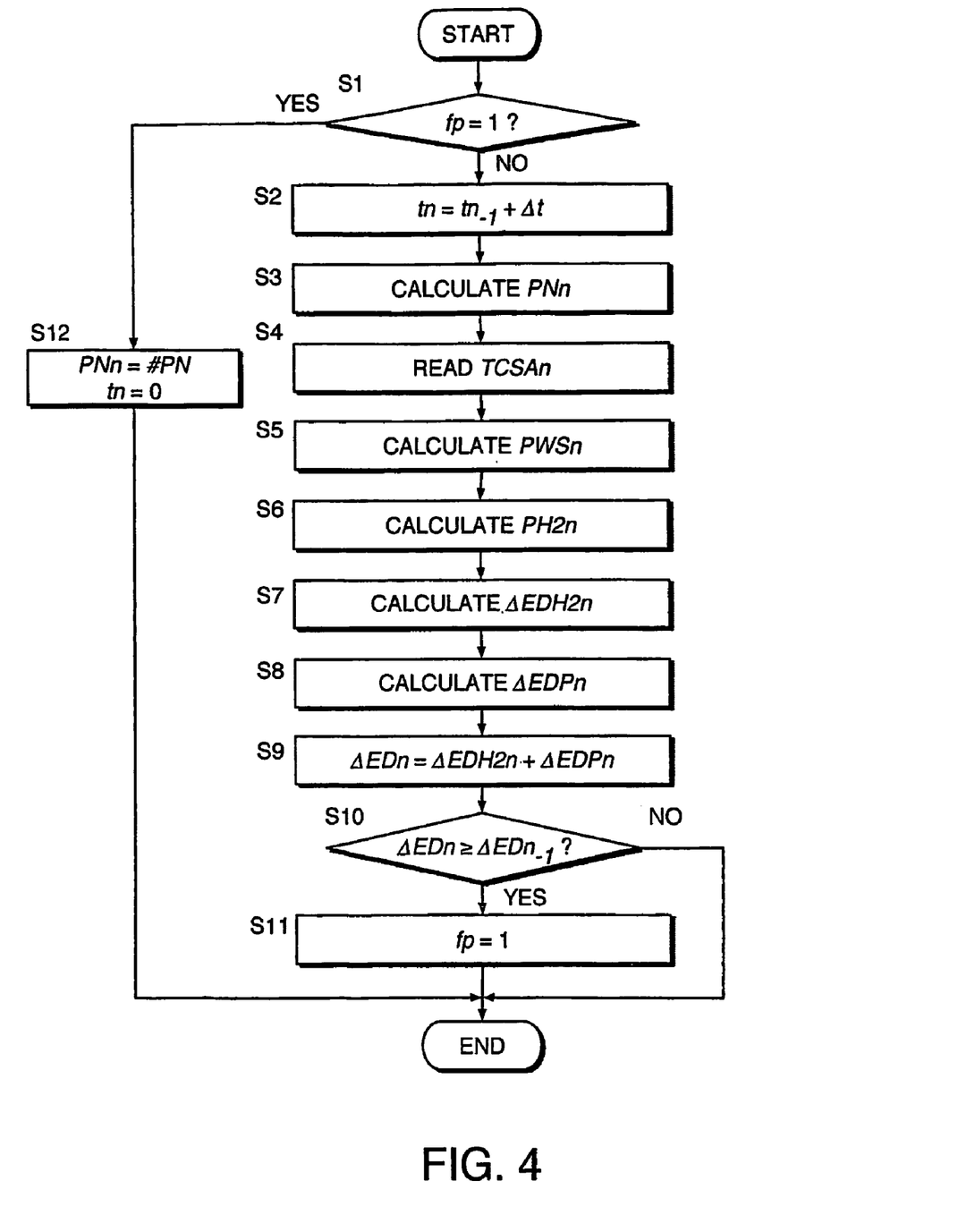
FIG. 4 is a flowchart illustrating a purging start determination routine executed by a controller according to this invention.
Figure 9:
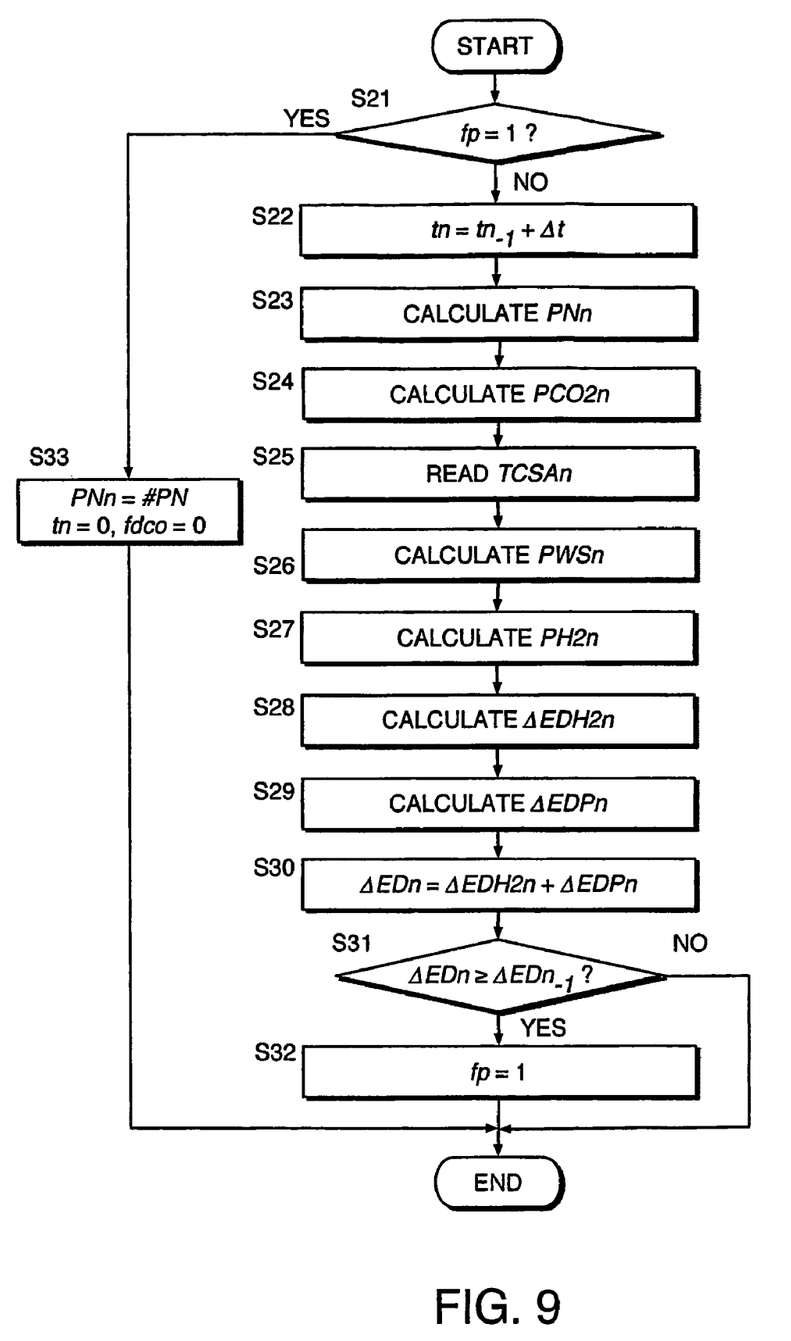
FIG. 9 is a flowchart illustrating a purging start determination routine executed by a controller according to the second embodiment of this invention.

FIG. 9 is a purging start determination routine, and corresponds to the routine in FIG. 4 of the first embodiment.

The processing of steps S21-S23 is identical to that of the steps S1-S3 in the routine in FIG. 4, and hence description thereof has been omitted.

It should be noted, however, that the calculation method of the step S3 can only be applied to the calculation of the nitrogen partial pressure $PNn$ in the step S23 when a CO removal flag $fdco$ to be described below is at zero. When the CO removal flag $fdco$ is at unity, the controller 11 applies a newest value of the nitrogen partial pressure $PNn$, which is calculated in a step S55 of the routine shown in FIG. 11 to be described below, as the nitrogen partial pressure.

In a step S24, the controller 11 calculates a partial pressure $PCO2n$ of the carbon dioxide contained in the anode gas. Here, a carbon dioxide amount $MCO2n$ in the anode gas is used to calculate the carbon dioxide partial pressure $PCO2n$ by means of a similar method to the equation (3) for calculating the nitrogen partial pressure which was learned in the step S3 (S23). The carbon dioxide amount $MCO2n$ in the anode gas is set as the newest value of the carbon monoxide amount in the anode gas which is calculated in a step S53 or a step S57 of FIG. 11, to be described below.

Next, in a step S25, the controller 11 reads a temperature $TCSAn$ of the fuel cell stack 1 detected by the temperature sensor 10 similarly to the step S5.

Next, in a step S26, the controller 11 detects the water vapor partial pressure $PWSn$ using the same method as that of the step S6.

Next, in a step S27, the controller 11 calculates the hydrogen partial pressure $PH2n$ according to the following equation (5).

$$PH2n = \text{anode gas pressure} - (PNn + PWSn + PCO2n) \quad (5)$$

The difference between the equation (5) and the equation (4) is that in the equation (5), the carbon dioxide partial pressure $PCO2n$ is taken into consideration. The anode gas also contains carbon monoxide (CO), but most of the carbon monoxide is converted into carbon dioxide ($CO_2$) due to the selective oxidation action of the catalyst 14, and hence the CO concentration in the anode gas is negligible compared to the nitrogen, water vapor, and carbon dioxide concentrations. Accordingly, the carbon monoxide (CO) partial pressure is ignored when calculating the hydrogen partial pressure $PH2n$.

The processing of steps S28-S32 is identical to that of the steps S7-S11 in the first embodiment.

When the controller 11 determines in the step S21 that the purge flag $fp$ is at unity, the processing of a step S33 is performed. In the step S33, in addition to performing identical reset processing to that of the step S12 in the first embodiment, the CO removal flag $fdco$ is reset to zero.

Next, referring to FIG. 10, a carbon monoxide removal determination routine executed by the controller 11 will be described. The controller 11 implements this routine repeatedly at a fixed interval $\Delta t$ during an operation of the fuel cell power plant. The fixed interval $\Delta t$ is set at 100 milliseconds.

In a first step S41, the controller 11 determines whether or not the purge flag $fp$ is at unity. If the purge flag $fp$ is at unity, or in other words if anode effluent purging is underway, the controller 11 immediately ends the routine.

When the purge flag $fp$ is not at unity, or in other words when purging is not underway, the controller 11 calculates a CO concentration $DCOn$ in the anode gas in a step S42.

Figure 12:
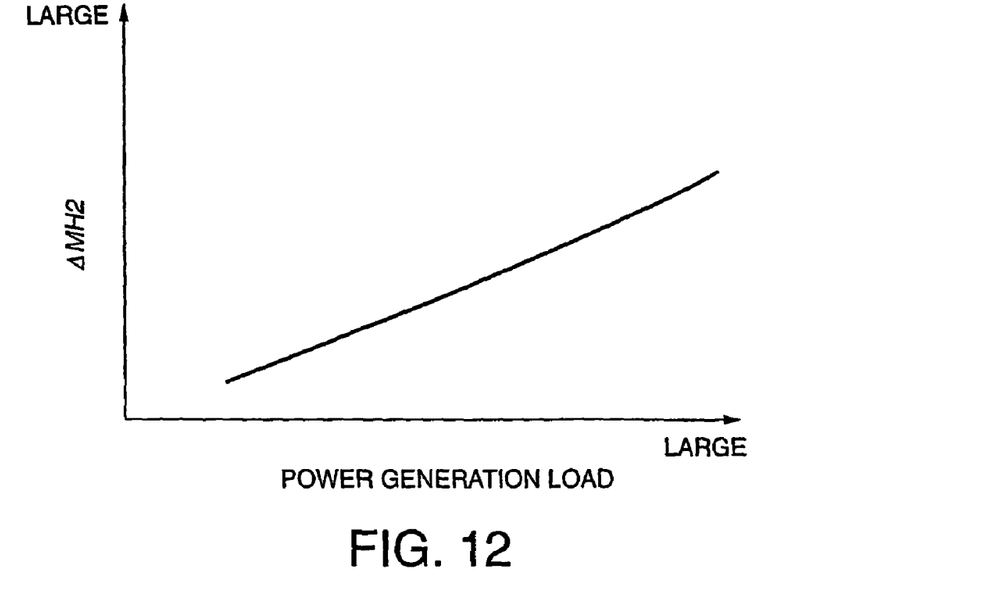
FIG. 12 is a diagram illustrating the characteristic of a hydrogen supply amount map which is stored in the controller according to the second embodiment of this invention.

For this purpose, the controller 11 first refers to a map having the characteristic shown in FIG. 12, which is stored in the internal memory (ROM) in advance, to determine a hydrogen supply flow rate $\Delta MH2$ from the hydrogen tank 3 to the hydrogen supply passage 12 on the basis of the load of the fuel cell stack 1.

Since the hydrogen supplied from the hydrogen tank 3 contains a fixed amount of carbon monoxide (CO), a CO amount $MCOn$ that is mixed into the anode gas can be calculated from the hydrogen supply flow rate $\Delta MH2$ according to the following equation (6).

$$MCOn = MCOn_{-1} + A \cdot \Delta MH2 \quad (6)$$

where, $MCOn_{-1} = MCOn$ calculated during execution of the previous routine, and A = the CO concentration in the hydrogen supplied during the time period $\Delta t$ = a constant.

The CO concentration DCOn in the anode gas is determined by dividing the CO amount MCOn mixed into the anode gas by the anode gas mass.

It should be noted that the above description of the calculation of the CO concentration DCOn in the anode gas relates to a calculation method performed when carbon monoxide removal is not underway in the routine in FIG. 11 to be described below. When carbon monoxide removal is underway in the routine in FIG. 11, the controller 11 calculates the CO concentration DCOn in the anode gas using the newest CO amount MCOn calculated in a step S54 in FIG. 11.

The anode gas contains nitrogen, carbon dioxide, water vapor, and hydrogen as well as carbon monoxide. The partial pressures of the nitrogen, water vapor, and hydrogen in the anode gas have already been calculated in the steps S23, S26, and S27 in FIG. 9.

The controller 11 determines the mass of nitrogen, water vapor, and hydrogen in the anode gas from the newest values of each of these partial pressures. To determine the mass of the carbon dioxide contained in the anode gas, the controller 11 uses the newest value of the $CO_2$ amount MCO2n which is calculated in the step S53 of the routine in FIG. 11 to be described below.

The controller 11 calculates the anode gas mass by adding the CO amount MCOn to the total mass of the nitrogen, carbon dioxide, water vapor, and hydrogen masses determined in the manner described above. The controller determines the CO concentration DCOn by determining the CO amount MCOn that is mixed into the anode gas according to the equation (6) and dividing the CO amount MCOn by the anode gas mass.

Next, in a step S43, the controller 11 determines whether or not the CO concentration DCOn exceeds a predetermined concentration #SHDCO.

When the CO concentration DCOn exceeds the predetermined concentration #SHDCO, the controller 11 sets the CO removal flag fdco to unity in a step S45. If the CO concentration DCOn does not exceed the predetermined concentration #SHDCO, the controller 11 resets the CO removal flag fdco to zero in a step S44.

The predetermined concentration #SHDCO is set with a sufficient safety margin using a concentration at which the performance of the anode 1A deteriorates due to carbon monoxide poisoning as a reference.

Following the processing of the step S44 or the step S45, the controller 11 ends the routine.

Next, referring to FIG. 11, a carbon monoxide removal routine, which is executed by the controller 11 on the basis of the CO removal flag fdco, will be described. The controller 11 implements this routine repeatedly at a fixed interval $\Delta t$ during an operation of the fuel cell power plant. The fixed interval $\Delta t$ is set at 100 milliseconds.

In a first step S50, the controller 11 determines whether or not the purge flag fp is at unity. If the purge flag fp is at unity, purging is underway, and in this case the routine is ended immediately.

If the purge flag fp is not at unity, a determination is made in a step S51 as to whether or not the CO removal flag fdco is at unity. If the CO removal flag fdco is at unity, the processing of steps S52-S55 is performed to remove carbon monoxide from the anode gas.

If the CO removal flag fdco is not at unity, then carbon monoxide removal is not necessary. In this case, the controller 11 operates the pump 15 at its normal rotation speed in a step S56.

Next, in a step S57, the $CO_2$ amount MCO2n in the anode gas is set to be equal to the value thereof $MCO2n_{-1}$ obtained during execution of the previous routine. Following the processing of the step S57, the controller 11 ends the routine.

In the steps S52-S55, the controller 11 removes carbon monoxide from the anode gas in the following manner.

First, in the step S52, the controller 11 reduces the rotation speed of the pump 15.

Next, in the step S53, the controller 11 calculates the $CO_2$ amount MCO2n in the anode gas according to the following equation (7).

$$MCO2n = MCO2n_{-1} + \delta \cdot MCO2 \quad (7)$$

where, $\delta MCO2$ = the amount of increase in the $CO_2$ amount MCO2n, and $MCO2n_{-1} = MCO2n$ calculated during execution of the previous routine.

MCO2 is a fixed value when the opening of the air supply valve 13 is fixed. In cases where the opening of the air supply valve 13 is varied, the controller 11 refers to a map, which is created in advance to define the relationship between the opening of the air supply valve 13 and the amount of $CO_2$ generated by the catalyst 14 per unit time, to determine the amount of generated $CO_2$ from the opening of the air supply valve 13, and then sets the amount of generated $CO_2$ as the amount of increase in the $CO_2$ amount MCO2n.

Figure 10:
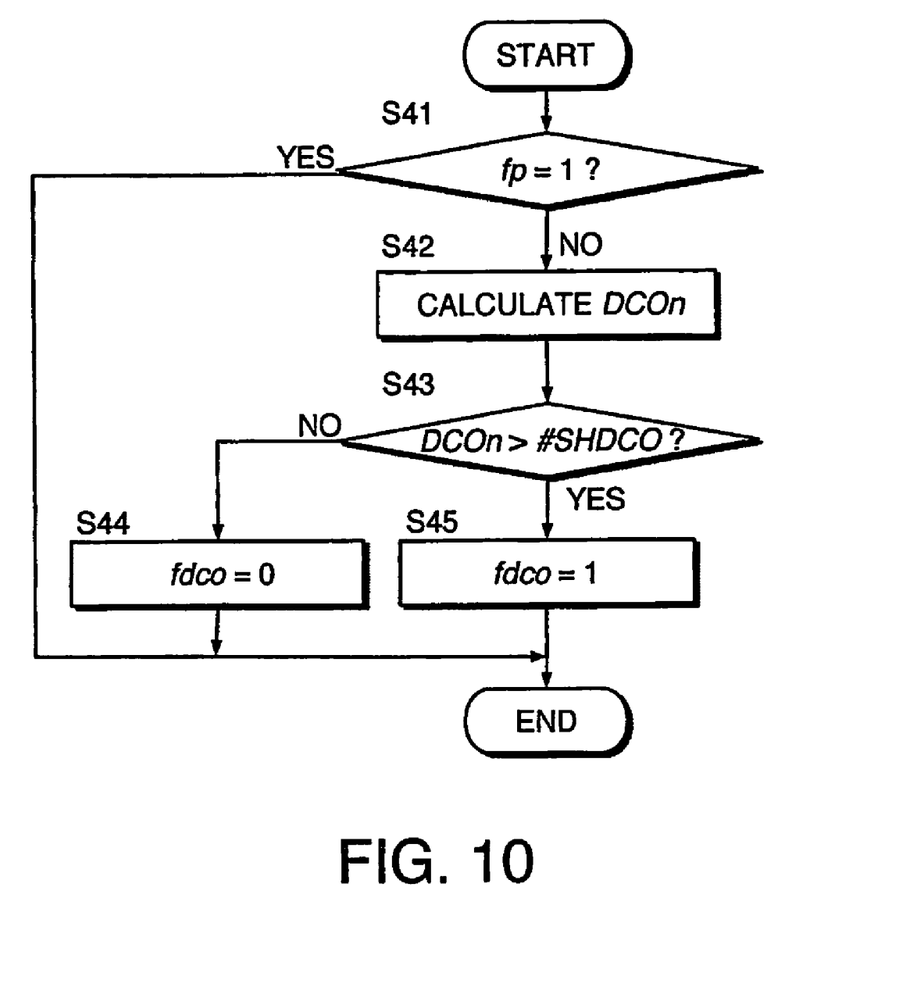
FIG. 10 is a flowchart illustrating a carbon monoxide removal determination routine executed by the controller according to the second embodiment of this invention.

Next, in the step S54, the controller 11 corrects the CO amount MCOn in the anode gas using the following equation (8).

$$MCOn = MCOn_{-1} - \delta \cdot MCO \quad (8)$$

where, $MCOn_{-1}$ = the newest value of the $CO_2$ amount MCO2n calculated in the step S42 of FIG. 10, and $\delta MCO$ = the amount of decrease in the CO amount accompanying the generation of $CO_2$.

$\delta MCO$ is calculated from the amount of increase $\delta MCO2$ in the $CO_2$ amount. The CO amount MCOn after correction is used in the manner described above to calculate the CO concentration DCOn in the anode gas in the step S42 when the routine of FIG. 10 is next executed.

Next, in the step S55, the controller 11 recalculates the nitrogen partial pressure PNn of the anode gas that was calculated in the step S23 of the routine in FIG. 9.

This recalculation is performed due to the fact that the nitrogen partial pressure in the anode gas is increased by the nitrogen contained in the air that is supplied to the return passage 5 to perform CO removal processing. When the fuel cell stack 1 is operating normally, the air supply pressure of the compressor 2 is constant, and hence the flow rate of the air that is supplied to the return passage 5 can be determined from the opening of the air supply valve 13. Accordingly, the flow rate of the nitrogen that is supplied to the return passage 5 can also be calculated from the opening of the air supply valve 13. The controller 11 converts the nitrogen flow into a nitrogen increase amount per routine execution interval $\Delta t$, adds the value thereof to the permeated nitrogen gas amount of the equation (1), and thus determines the nitrogen increase amount per $\Delta t$. The nitrogen increase amount is time-integrated in a similar fashion to the equation (2), whereupon the equation (3) is applied to the obtained permeated nitrogen gas amount to obtain the nitrogen partial pressure PNn of the anode gas. The nitrogen partial pressure PNn of the anode gas thus recalculated is used in the step S27 of the next execution of the routine in FIG. 9 as described above.

Following the processing of the step S55, the controller ends the routine.

According to this embodiment, purging is performed at the most appropriate point on the basis of the energy balance, similarly to the first embodiment. Further, carbon monoxide (CO) removal is performed on the basis of the CO concentration DCOn in the anode gas. Hence reductions in the power generation efficiency of the fuel cell stack 1 due to carbon monoxide poisoning of the anode 1A can also be prevented.

As a result of carbon monoxide accumulation, the anode effluent that is re-circulated into the hydrogen supply passage 4 from the return passage 5 has a higher CO concentration than the anode gas which is constituted by anode effluent and hydrogen supplied from the hydrogen tank 3. In this embodiment, the catalyst 14 which selectively oxidizes carbon monoxide is provided in the return passage 5 having a high CO concentration, and hence carbon monoxide can be oxidized efficiently.

Figure 13:
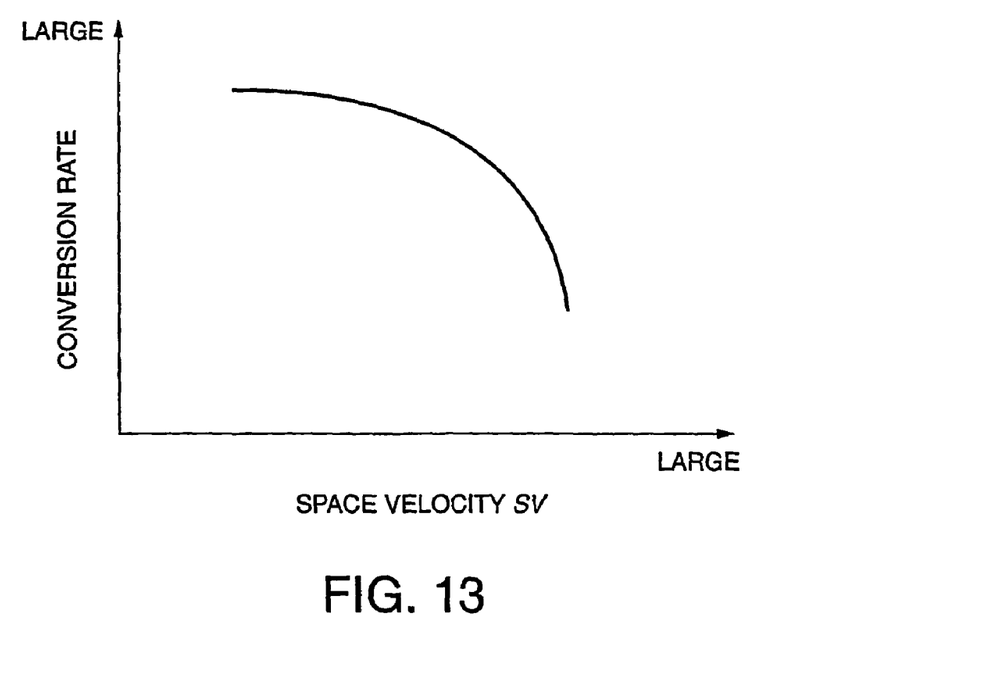
FIG. 13 is a diagram illustrating the conversion rate of a catalyst according to the second embodiment of this invention.

Referring to FIG. 13, the selective oxidation catalyst 14 exhibits a higher conversion rate, or in other words a better CO oxidation performance, as the spatial velocity SV of the subject gas decreases. By providing the catalyst 14 in the return-passage 5 having a low spatial velocity SV, the catalyst 14 exhibits a good CO oxidation performance, and as a result, the catalyst 14 can be reduced in size.

Figure 11:
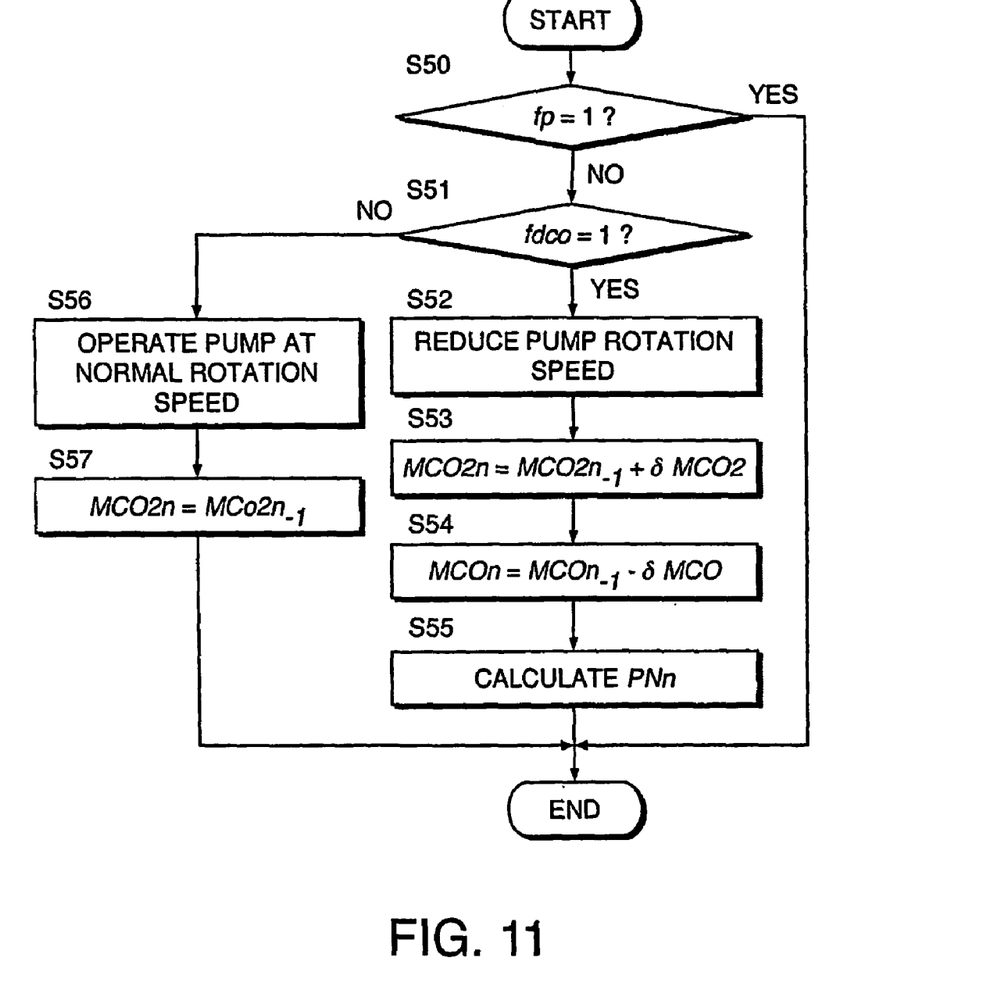
FIG. 11 is a flowchart illustrating a carbon monoxide removal routine executed by the controller according to the second embodiment of this invention.

In the step S52 of FIG. 11, the rotation speed of the pump 15 is reduced at the time of carbon monoxide removal. This is in order to reduce the anode effluent re-circulation rate temporarily such that the flow rate of anode effluent flowing out of the anode 1A into the return passage 5 is reduced and the CO concentration is increased. As a result, mixing of the anode effluent with the air that is supplied to the return passage 5 from the air supply passage 12 is promoted, and thus the downstream catalyst 14 can perform carbon monoxide oxidation using little air. In so doing, the reduction in hydrogen partial pressure which accompanies the introduction of air can be suppressed.

In this embodiment, the carbon dioxide partial pressure PCO2n is taken into consideration when calculating the hydrogen partial pressure PH2n in the routine in FIG. 9. Moreover, in the step S55 in FIG. 11, the nitrogen partial pressure PNn is recalculated taking into consideration the air that is supplied for carbon monoxide removal. The effect of the air supplied for carbon monoxide removal and the effect caused by carbon monoxide oxidation are thus reflected in the calculation of the hydrogen partial pressure PH2n, and as a result, carbon monoxide removal can be performed without impairing the precision with which the purging start timing is determined.

In this embodiment, the amount of carbon monoxide contained in the anode gas is calculated on the basis of the amount of hydrogen supplied from the hydrogen tank 3, and carbon monoxide removal is performed when the CO concentration DCOn that is calculated from the carbon monoxide amount exceeds the predetermined concentration #SHDCO. As a result, the timing of carbon monoxide removal can be determined accurately.

Figure 14:
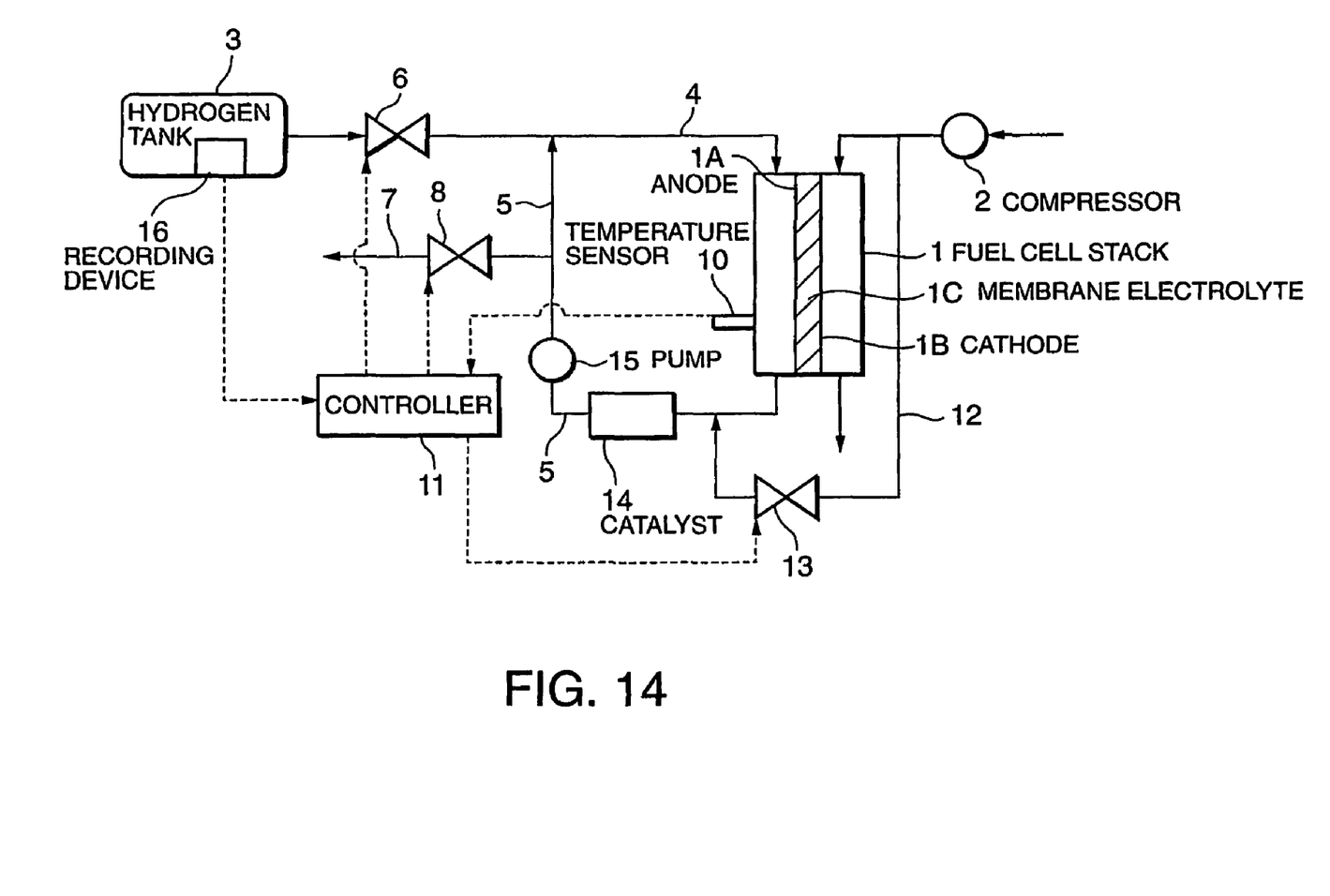
FIG. 14 is a schematic diagram of a fuel cell power plant according to a third embodiment of this invention.

Next, referring to FIG. 14, a third embodiment of this invention will be described.

In this embodiment, a recording device 16 using an integrated circuit (IC) is annexed to the hydrogen tank 3 of the fuel cell power plant according to the second embodiment. The CO concentration of the hydrogen that is stored in the hydrogen tank 3 is recorded on the recording device 16. The CO concentration data are extracted when the hydrogen tank 3 is refilled with hydrogen by means of data communication between the recording device 16 and a refill station which refills the hydrogen tank 3 with hydrogen.

In cases where the hydrogen for refilling the hydrogen tank 3 contains impurities caused by other inert gases, the recording device 16 preferably records further impurity concentration data.

The recording device 16 and controller 11 are connected by a signal circuit, and the CO concentration and impurity concentration are provided to the controller 11 as signals. Similarly to the second embodiment, the controller 11 determines the purging start ting and performs carbon monoxide removal by executing the routines in FIGS. 9-11. In the step S42 in FIG. 10, the equation (6) is used to calculate the CO amount MCOn in the anode gas. At this time, the controller 11 can determine the constant A using the CO concentration and impurity concentration read from the recording device 16.

According to this embodiment, the CO concentration of the hydrogen supplied from the hydrogen tank 3 can be grasped accurately without the use of a gas concentration sensor, and as a result, variation in the CO concentration DCOn in the anode gas during an operation of the fuel cell stack 1 can be calculated accurately.

The contents of Tokugan 2003-147996, with a filing date of May 26, 2003 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, in each of the embodiments described above, this invention is applied to a fuel cell power plant which generates power using hydrogen from the hydrogen tank 3. However, this invention is also applicable to a fuel cell power plant which extracts hydrogen by reforming hydrocarbon fuel.

INDUSTRIAL FIELD OF APPLICATION

As described above, in this invention, the start timing of purging is determined on the basis of the energy balance during power generation performed by a fuel cell stack while anode effluent is re-circulated into anode gas, and hence the fuel cell stack can be operated with favorable power generation efficiency at all times. Accordingly, this invention exhibits particularly favorable effects when applied to a fuel cell power plant for driving a vehicle, in which limitations on the hydrogen storage capacity and fuel cell stack disposal space are severe.

The invention claimed is:

1. An anode effluent control method for a fuel cell power plant comprising a fuel cell stack which performs power generation using anode gas having hydrogen as a main component, the anode gas being discharged from the fuel cell stack as anode effluent following a power generation reaction, a return passage which re-circulates the anode effluent into the anode gas, and a purge valve which discharges the anode effluent in the return passage to the outside of the passage, the control method comprising:

calculating a first energy loss caused by an increase in a non-hydrogen component in the anode gas while the purge valve is closed;

calculating a second energy loss which corresponds to an amount of hydrogen lost from the anode gas when the purge valve is opened;

maintaining the purge valve in a closed state when the second energy loss is larger than the first energy loss; and opening the purge valve when the second energy loss equals or falls below the first energy loss.

2. The anode effluent control method as defined in claim 1, wherein the non-hydrogen component includes nitrogen and water vapor.

3. The anode effluent control method as defined in claim 2, wherein the control method further comprises:
   calculating a nitrogen partial pressure of the anode gas in accordance with a duration of the closed state of the purge valve;
   determining a temperature of the fuel cell stack;
   calculating a water vapor partial pressure of the anode gas on the basis of the temperature of the fuel cell stack;
   calculating a hydrogen partial pressure of the anode gas by subtracting the nitrogen partial pressure and the water vapor partial pressure from an anode gas pressure; and
   calculating the first energy loss on the basis of variation in the hydrogen partial pressure.

4. The anode effluent control method as defined in claim 3, wherein the fuel cell stack comprises an anode which is exposed to the anode gas, a cathode, and an electrolyte membrane disposed between the anode and the cathode, the fuel cell power plant further comprises an air supply device which supplies air to the cathode, and the control method further comprises calculating the nitrogen partial pressure of the anode gas on the basis of an amount of nitrogen in the anode gas which increases as nitrogen in the air permeates the electrolyte membrane from the cathode so as to reach the anode.

5. The anode effluent control method as defined in claim 3, wherein the fuel cell power plant further comprises an anode gas passage which supplies the anode gas to the fuel cell stack, a hydrogen supply device which supplies hydrogen to the anode gas passage, a catalyst which oxidizes carbon monoxide in the anode effluent in the return passage, and an air supply device which supplies air for oxidizing the carbon monoxide to the return passage, and the control method further comprises calculating an accumulated amount of the carbon monoxide in the anode gas that was contained in the hydrogen supplied to the anode gas passage from the hydrogen supply device, comparing the accumulated amount to a predetermined value, and supplying air to the return passage from the air supply device when the accumulated amount is larger than the predetermined value.

6. The anode effluent control method as defined in claim 5, wherein the control method further comprises preventing the air supply device from supplying air to the return passage when the purge valve is open.

7. The anode effluent control method as defined in claim 5, wherein the fuel cell power plant further comprises a pump for pressurizing the anode effluent in the return passage so as to introduce the anode effluent into the anode gas passage, and the control method further comprises reducing the rotation speed of the pump when air is supplied to the return passage from the air supply device.

8. The anode effluent control method as defined in claim 5, wherein the control method further comprises calculating a partial pressure of carbon dioxide that is mixed into the anode gas as a result of a carbon monoxide oxidation operation performed by the catalyst, correcting the nitrogen partial pressure of the anode gas on the basis of an amount of air supplied to the return passage, and calculating the hydrogen partial pressure by subtracting the water vapor partial pressure, the carbon dioxide partial pressure, and a corrected nitrogen partial pressure from the anode gas pressure.

9. The anode effluent control method as defined in claim 5, wherein the fuel cell power plant further comprises a recording device which pre-records a carbon monoxide content of the hydrogen that is supplied by the hydrogen supply device, and the control method further comprises calculating the accumulated amount of carbon monoxide in the anode gas on the basis of the carbon monoxide content recorded in the recording device.

10. The anode effluent control method as defined in claim 3, wherein the control method further comprises calculating the nitrogen partial pressure of the anode gas as a value which increases as a duration of the closed state of the purge valve lengthens.

11. The anode effluent control method as defined in claim 3, wherein the control method further comprises calculating the water vapor partial pressure of the anode gas as a value which increases as a temperature of the fuel cell stack rises.

12. The anode effluent control method as defined in claim 1, wherein the control method further comprises calculating the second energy loss as a value which decreases in accordance with a duration of the closed state of the purge valve.

13. An anode effluent control device for a fuel cell stack which performs power generation using anode gas having hydrogen as a main component, the anode gas being discharged from the fuel cell stack as anode effluent following a power generation reaction, the device comprising:
   a return passage which re-circulates the anode effluent into the anode gas;
   a purge valve which discharges the anode effluent in the return passage to the outside of the passage; and
   a programmable controller programmed to:
   calculate a first energy loss caused by an increase in a non-hydrogen component in the anode gas while the purge valve is closed;
   calculate a second energy loss which corresponds to an amount of hydrogen lost from the anode gas when the purge valve is opened;
   maintain the purge valve in a closed state when the second energy loss is larger than the first energy loss; and
   open the purge valve when the second energy loss equals or falls below the first energy loss.

14. The anode effluent control device as defined in claim 13, wherein the non-hydrogen component includes nitrogen and water vapor.

15. The anode effluent control device as defined in claim 14, wherein the controller is further programmed to:
   calculate a nitrogen partial pressure of the anode gas in accordance with a duration of the closed state of the purge valve;
   determine a temperature of the fuel cell stack;
   calculate a water vapor partial pressure of the anode gas on the basis of the temperature of the fuel cell stack;
   calculate a hydrogen partial pressure of the anode gas by subtracting the nitrogen partial pressure and the water vapor partial pressure from an anode gas pressure; and
   calculate the first energy loss on the basis of variation in the hydrogen partial pressure.

16. The anode effluent control device as defined in claim 15, wherein the fuel cell stack comprises an anode which is exposed to the anode gas, a cathode, and an electrolyte membrane disposed between the anode and the cathode, the device further comprises an air supply device which supplies air to the cathode, and the controller is further programmed to calculate the nitrogen partial pressure of the anode gas on the basis of an amount of nitrogen in the anode gas which increases as nitrogen in the air permeates the electrolyte membrane from the cathode so as to reach the anode.

17. The anode effluent control device as defined in claim 15, wherein the device further comprises an anode gas passage which supplies the anode gas to the fuel cell stack, a hydrogen supply device which supplies hydrogen to the anode gas passage, a catalyst which oxidizes carbon monoxide in the anode effluent in the return passage, and an air supply device which supplies air for oxidizing the carbon monoxide to the return passage, and the controller is further programmed to calculate an accumulated amount of the carbon monoxide in the anode gas that was contained in the hydrogen supplied to the anode gas passage from the hydrogen supply device, compare the accumulated amount to a predetermined value, and supply air to the return passage from the air supply device when the accumulated amount is larger than the predetermined value.

18. The anode effluent control device as defined in claim 17, wherein the controller is further programmed to prevent the air supply device from supplying air to the return passage when the purge valve is open.

19. The anode effluent control device as defined in claim 17, wherein the device further comprises a pump for pressurizing the anode effluent in the return passage so as to introduce the anode effluent into the anode gas passage, and the controller is further programmed to reduce the rotation speed of the pump when air is supplied to the return passage from the air supply device.

20. The anode effluent control device as defined in claim 17, wherein the controller is further programmed to calculate a partial pressure of carbon dioxide that is mixed into the anode gas as a result of a carbon monoxide oxidation operation performed by the catalyst, correct the nitrogen partial pressure of the anode gas on the basis of an amount of air supplied to the return passage, and calculate the hydrogen partial pressure by subtracting the water vapor partial pressure, the carbon dioxide partial pressure, and a corrected nitrogen partial pressure from the anode gas pressure.

21. The anode effluent control device as defined in claim 17, wherein the device further comprises a recording device which pre-records a carbon monoxide content of the hydrogen that is supplied by the hydrogen supply device, and the controller is further programmed to calculate the accumulated amount of carbon monoxide in the anode gas on the basis of the carbon monoxide content recorded in the recording device.

22. The anode effluent control device as defined in claim 15, wherein the controller is further programmed to calculate the nitrogen partial pressure of the anode gas as a value which increases as a duration of the closed state of the purge valve lengthens.

23. The anode effluent control device as defined in claim 15, wherein the controller is further programmed to calculate the water vapor partial pressure of the anode gas as a value which increases as a temperature of the fuel cell stack rises.

24. The anode effluent control device as defined in claim 13, wherein the controller is further programmed to calculate the second energy loss as a value which decreases in accordance with a duration of the closed state of the purge valve.

25. An anode effluent control device for a fuel cell stack which performs power generation using anode gas having hydrogen as a main component, the anode gas being discharged from the fuel cell stack as anode effluent following a power generation reaction, the device comprising:
   a return passage which re-circulates the anode effluent into the anode gas;
   a purge valve which discharges the anode effluent in the return passage to the outside of the passage;
   means for calculating a first energy loss caused by an increase in a non-hydrogen component in the anode gas while the purge valve is closed;
   means for calculating a second energy loss which corresponds to an amount of hydrogen lost from the anode gas when the purge valve is opened;
   means for maintaining the purge valve in a closed state when the second energy loss is larger than the first energy loss; and
   means for opening the purge valve when the second energy loss equals or falls below the first energy loss.

* * * * *